Jan. 29, 1924.  1,482,198
M. LEBEIS
CARD SORTING MACHINE
Filed Oct. 12, 1922  13 Sheets-Sheet 1
Fig.1.
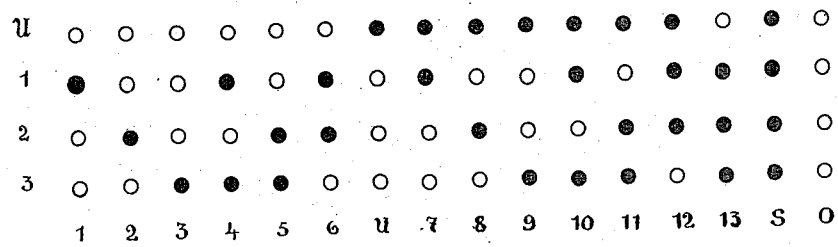
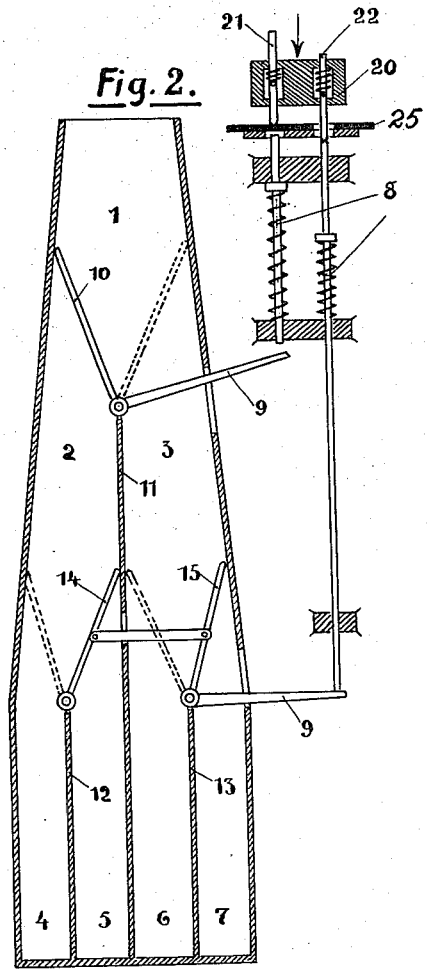
Fig.2.
Inventor:
Martin Lebeis Jan. 29, 1924.

M. LEBEIS 1,482,198

CARD SORTING MACHINE

Filed Oct. 12, 1922

Inventor:

Martin Lebeis

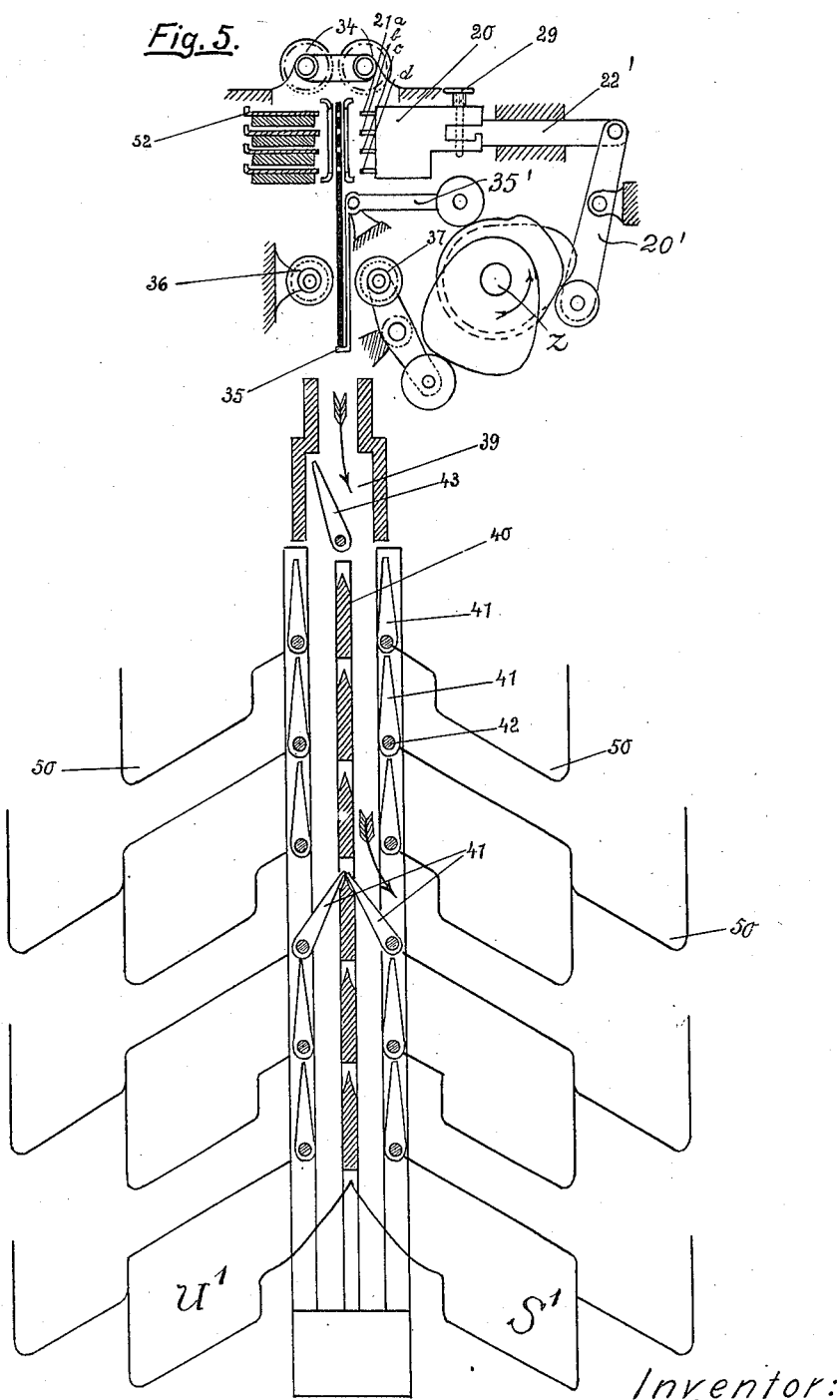

Inventor:
Martin Lebeis

Jan. 29, 1924.

M. LEBEIS 1,482,198

CARD SORTING MACHINE

Filed Oct. 12, 1922   13 Sheets-Sheet 6

Inventor:
Martin Lebeis

Jan. 29, 1924. 1,482,198
M. LEBEIS
CARD SORTING MACHINE
Filed Oct. 12, 1922 13 Sheets-Sheet 7

Inventor:
Martin Lebeis

Jan. 29, 1924.

M. LEBEIS 1,482,198

CARD SORTING MACHINE

Filed Oct. 12, 1922

Inventor:
Martin Lebeis

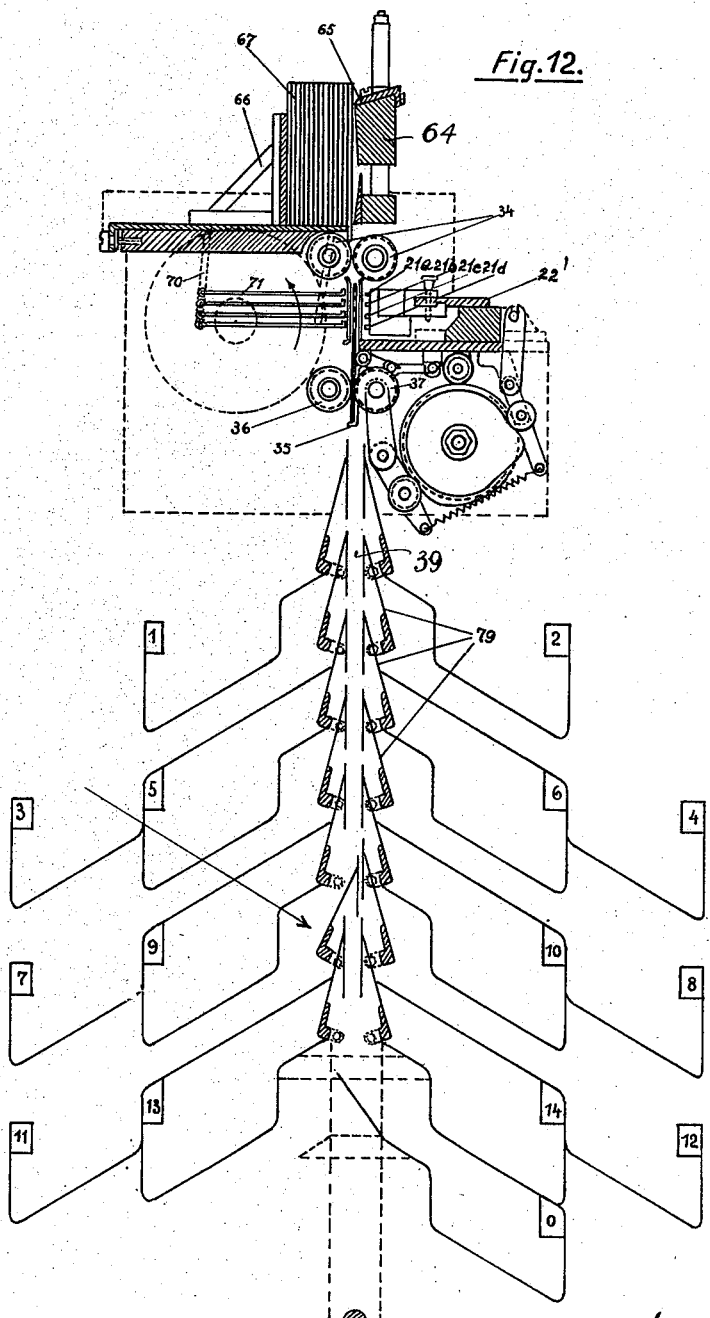

Jan. 29, 1924.  M. LEBEIS  1,482,198
CARD SORTING MACHINE
Filed Oct. 12, 1922   13 Sheets-Sheet 10
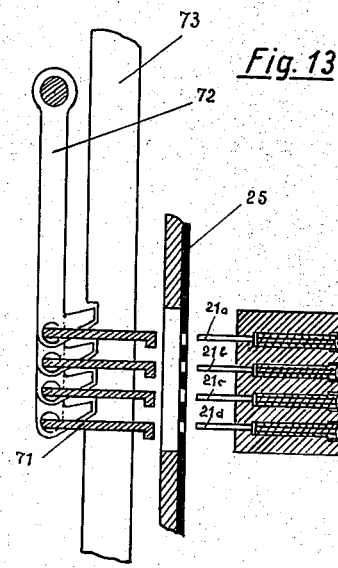
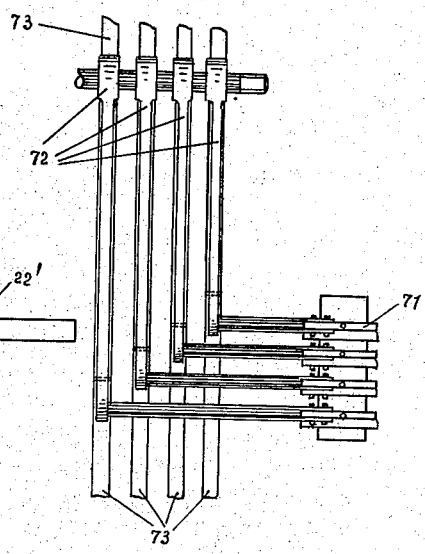
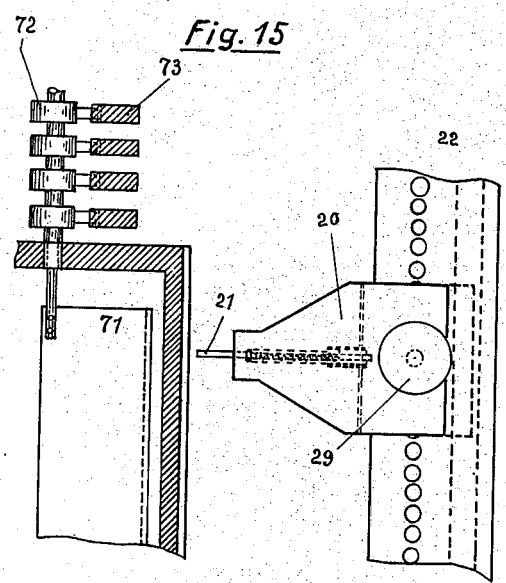
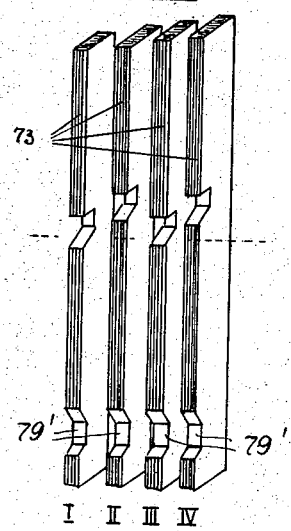
Inventor:
Martin Lebeis

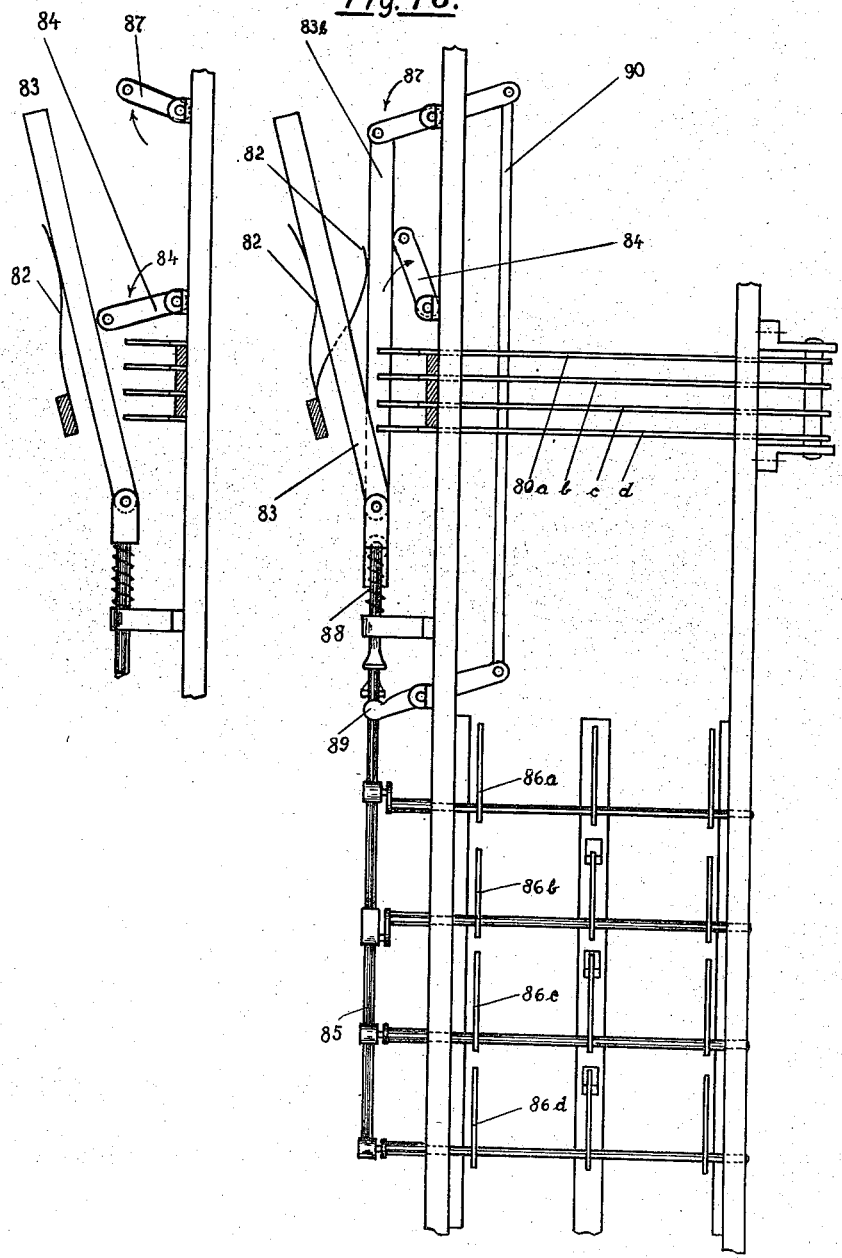

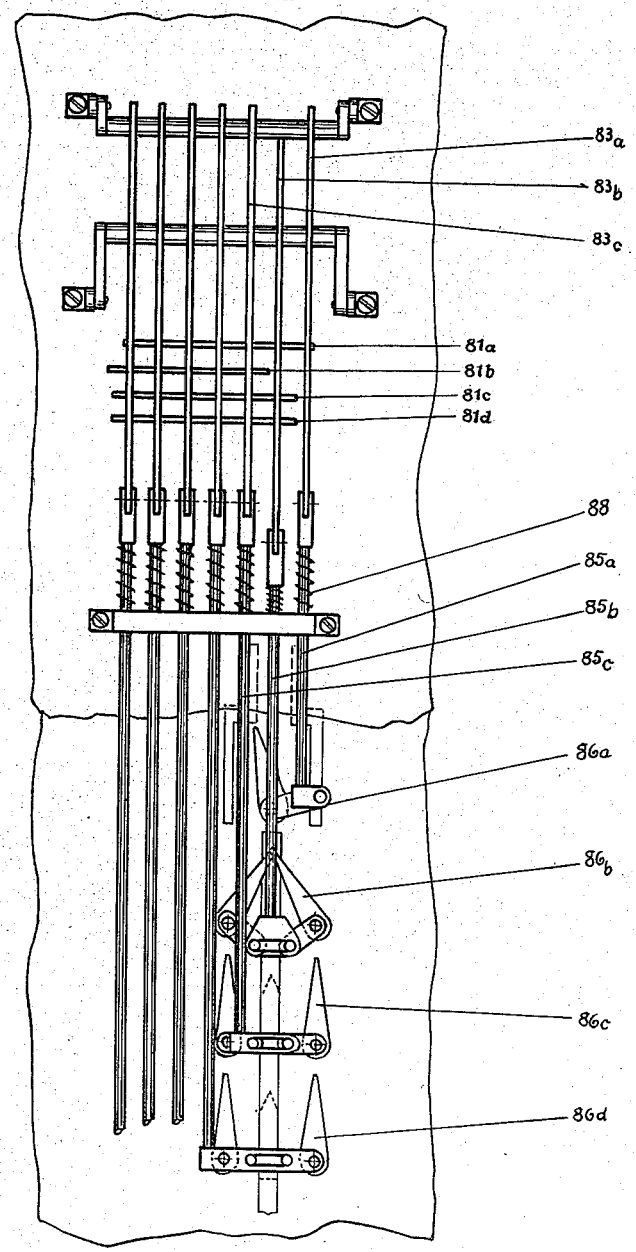

Jan. 29, 1924.

M. LEBEIS 1,482,198

CARD SORTING MACHINE

Filed Oct. 12, 1922   13 Sheets-Sheet 13

Fig.20.

Inventor:

Martin Lebeis

Patented Jan. 29, 1924.

1,482,198

UNITED STATES PATENT OFFICE.

MARTIN LEBEIS, OF BERLIN-FRIEDENAU, GERMANY, ASSIGNOR TO VOX MASCHINEN-AKTIENGESELLSCHAFT, OF BERLIN, GERMANY.

CARD-SORTING MACHINE.

Application filed October 12, 1922. Serial No. 594,135.

*To all whom it may concern:*

Be it known that I, MARTIN LEBEIS, a citizen of the German Republic, residing at Berlin-Friedenau, Germany, have invented certain Improvements in Card-Sorting Machines, of which the following is a specification.

This invention relates to a machine for sorting cards used for statistical and like purposes and of the kind in which the cards are passed singly through a selecting mechanism having feelers which, by being admitted through the apertures in the card, direct them to different receptacles. Usually the cards are either delivered by means of rollers or aprons to different destinations, or they are fed into a pivoted hopper which is tripped so as to drop the card into one of a series of receiving channels.

According to the present invention the cards are dropped into a vertical channel which communicates with a plurality of receivers, part of the channel walls being formed by flaps which can be set for diverting the cards to the various receivers, and means are provided whereby a large number of flaps can be selected and operated by a much smaller number of feelers.

Fig. 1 of the accompanying drawings is a diagram showing the different sorting possibilities obtainable by means of four setting elements, Fig. 2, a sectional view of an apparatus having only two mechanical setting elements, Fig. 3, a view of an electrically operated sorting device with four setting elements, Fig. 4, a view showing how the electrically operated elements can be replaced by pneumatic ones, Fig. 5, a view of an apparatus of a modified construction, and Figs. 6 to 9, detail views of this construction on a larger scale, Fig. 8 being a cross-section on the line $x-x$, and Fig. 9, a cross-section on the line A of Fig. 6.

Figure 3:
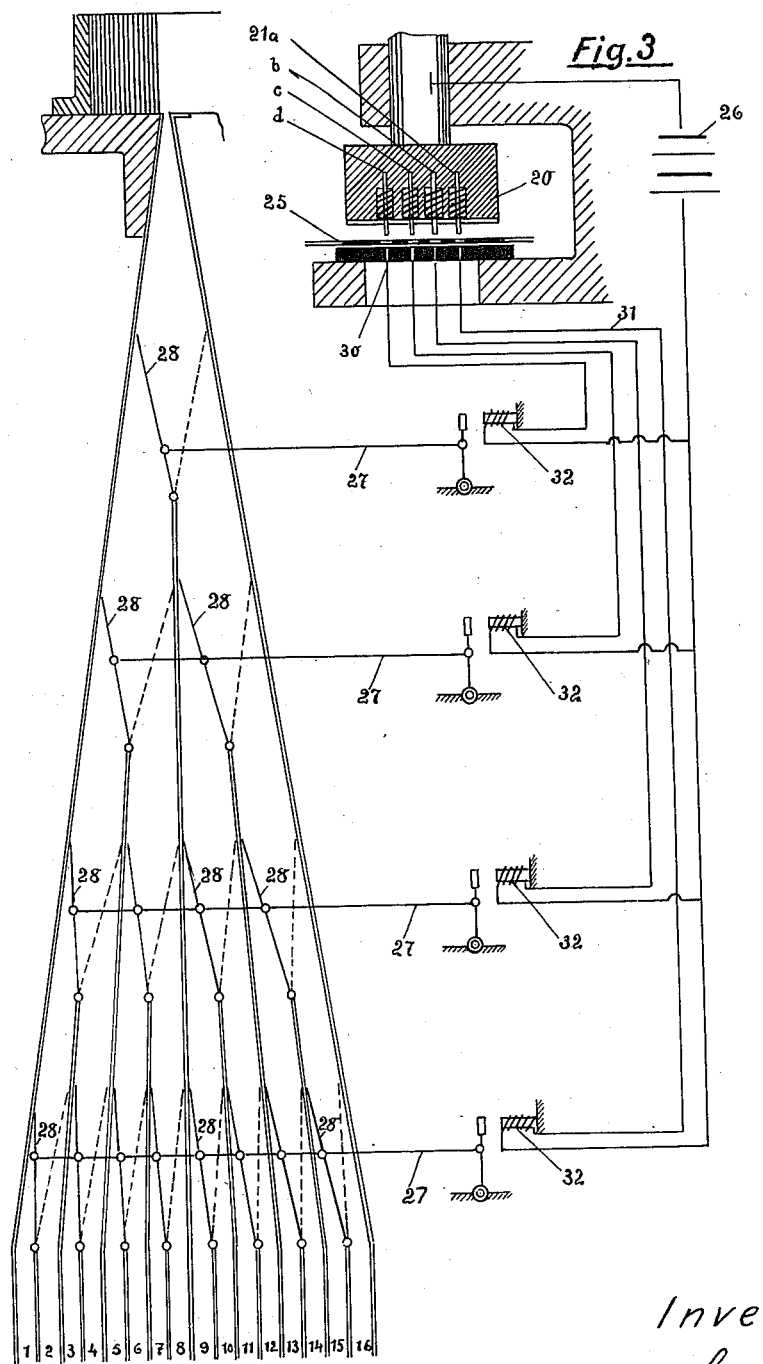

Fig. 18, a side view showing this element in use,

Fig. 19, a view showing the elements at right angles to Fig. 18, and

Fig. 20, a diagram showing the shape of the different setting elements.

The sorting device is based on the well-known combination principle according to which $2^n$ alternatives are obtainable from the different combinations of $n$ elements. Thus, for instance, if cards inserted in a sorting machine, are adapted to coöperate with four feelers, the latter can be utilized for sorting the cards into sixteen different compartments. The vertical groups 1 to 13, U, S, O, of dots and rings show the alternative treatments of the cards for co-operation with feelers U', 1', 2', 3'. The dots represent apertures punched in the cards so as to let the feelers through, and the rings, places against which the feelers abut without being admitted.

In Fig. 2, an apparatus is shown in which only two feelers are employed for sorting the cards 25 entering a delivery channel into four different compartments 4 to 7. A partition 11 divides the channel 1 into two branches 2 and 3 which are in their turn sub-divided further down by partitions 12 and 13 so as to form the compartments 4 to 7. At the upper part of the partition 11 there is a flap 10 which can be set for diverting the admitted cards into either of the channels 2 and 3, and the plates 12 and 13 carry, in a similar manner, flaps 14 and 15 for diverting the cards into the various compartments. The flaps are operated by means of levers 9 and spring-actuated rods 8 which latter are depressed by feelers 21 and 22 when the latter are admitted through apertures in the cards. The flaps 14 and 15 are coupled so as to move in unison. The feelers are resiliently held in a reciprocating head 20 which is approached to the card after the latter has been placed on a support. The levers 9 are either linked to the rods 8 or actuated by separate springs so as to hold the flaps normally in their left-hand position with reference to Fig. 2. Thus, if a card having no apertures, is passed through the machine, it is delivered direct to the compartment 7, as there is no readjustment of the flaps. However, if the card has an aperture, as shown in Fig. 2, which lets the feelers 22 through, the latter reverses the flaps 14 and 15, and the card will be delivered into the compartment 6. An aperture which admits the feeler 21 would cause the flap 10 to be reversed and the card to be delivered into the compartment 5, whereas, if two apertures were present so as to admit both feelers, all the flaps would be reversed, and the card will go to the compartment 4.

Fig. 3 shows a similar arrangement in which four feelers $21^{a-d}$ are employed so that the cards will be sorted, by flaps 28, into compartments 1 to 16. In this case the sorting is effected electrically, the flaps, which are connected in groups, being operated by means of magnets 32 whose armatures are connected by traction elements 27 to the different groups of flaps. The feelers let through the cards make contact with studs 30 so as to close the different circuits 31 of the battery 26.

Figure 4:
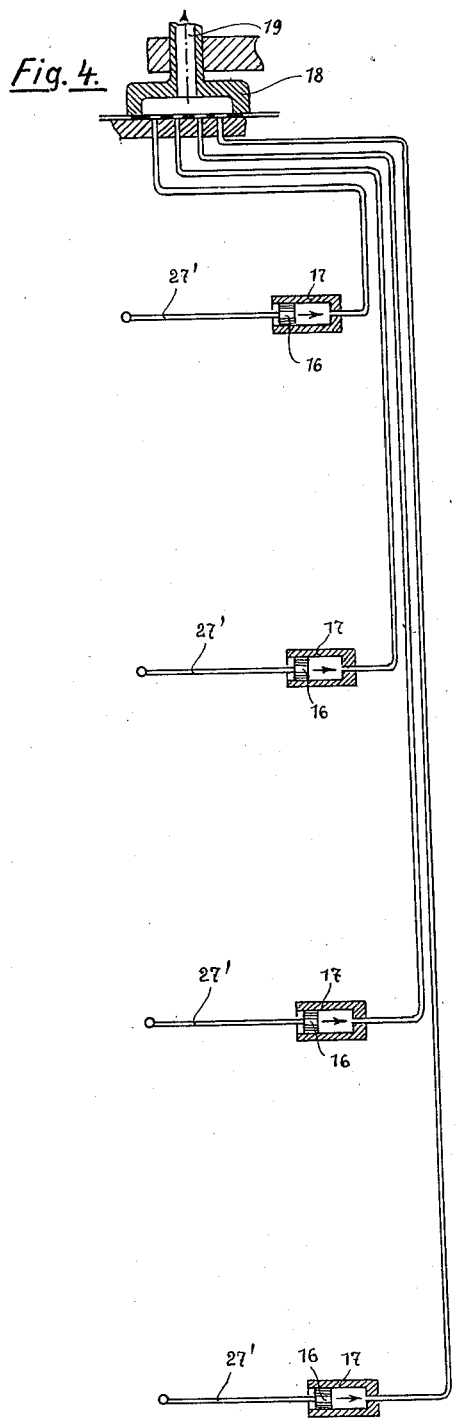

The same arrangement can be operated pneumatically, as shown in Fig. 4, a hollow head 18 being applied to the card over a series of nozzles communicating with cylinders 17 containing pistons 16. The latter are connected by rods 27 to the different groups of flaps. A pipe 19 communicating with the head 18, and, where there is an aperture in the card, also with one of the cylinders 17. Thus the pistons can be actuated, either by suction or by pressure for a reversal of the flaps.

Since the coupling of many flaps increases the strain put upon operating elements which might have to be delicate, it might be expedient to modify the arrangement so that no more than three flaps need be operated at a time whatever be the number of assortments. Such an arrangement is shown in Figs. 5 to 9 according to which the cards are delivered into an upright channel 39 which is divided by a partition 40 into two branches into either of which the cards can be diverted by the adjustment of a flap 43. The outer walls of the channels are composed of flaps 41 which are mounted on horizontal shafts 42 so that they can be turned inwards for diverting the cards out of the channels into different receiving hoppers 50. If no operation of the flaps takes place the card goes into one of the bottom hoppers $U_1$ or $S_1$, according to the normal position of the flap 43. When this flap alone is operated, the other bottom hopper receives the card.

Figure 6:
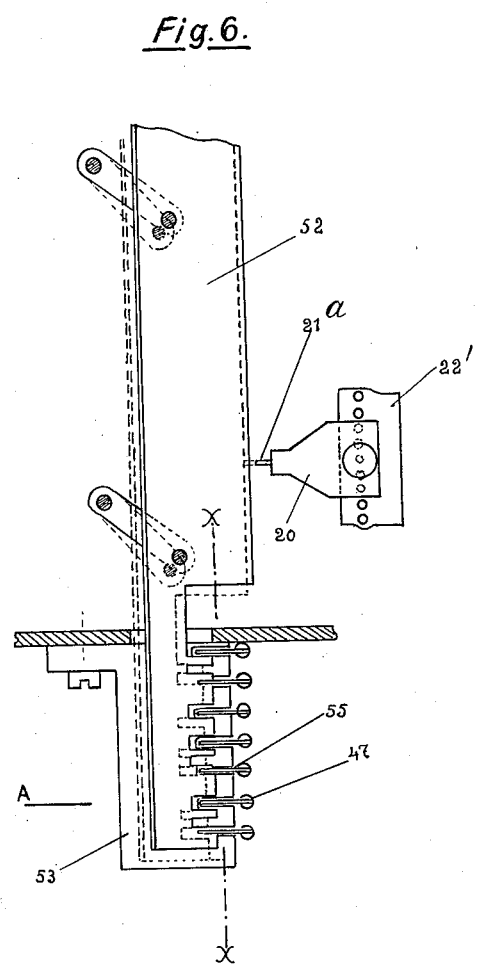
Figure 7:
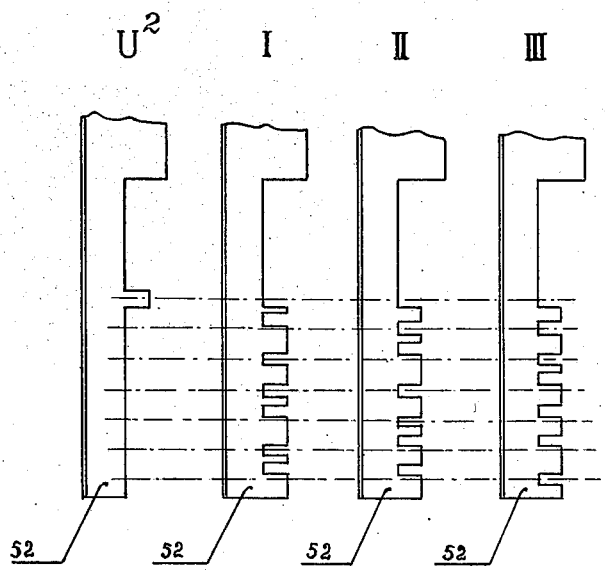
Figure 8:
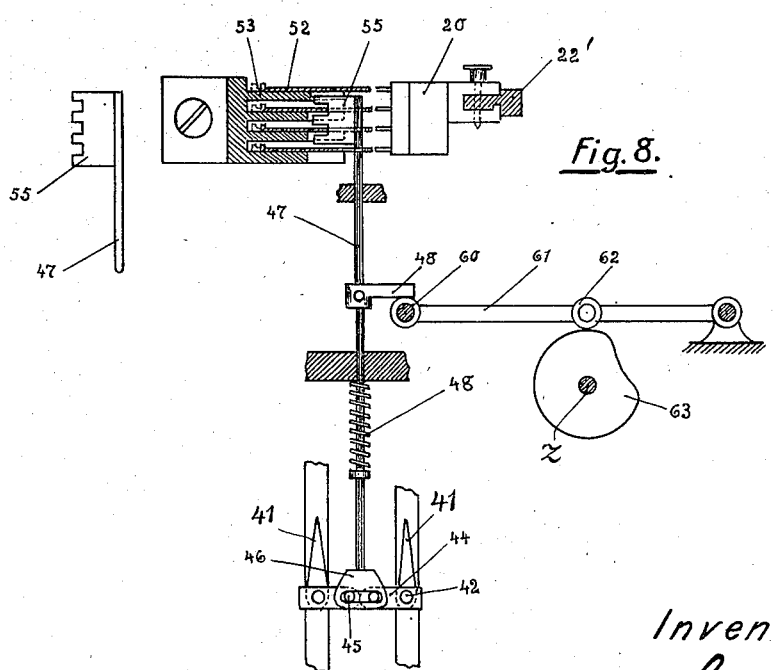

The flaps 41 are coupled in pairs by the provision on the respective shafts 42 of arms 44 and of pins 45 on these arms which take into a slot in a plate 46 carried at the lower end of a rod 47. The rods are actuated by springs 48 which tend to force them down so as to place the flaps 41 against the center partition as shown in the middle of Fig. 5. The machine is operated by means of a cam shaft $z$ which controls a series of levers 61 by means of a cam or cams 63. Each lever rests on the cam by means of a roller 62 and has at its free end a roller 60 by means of which it supports one of the rods 47, by engagement with a bracket 49, so as to hold the flaps 41 in the upright position during part of the revolution of the shaft $z$. When the feelers are in operation, however, the cam allows the lever 61 to drop so as to set the rods free for selection according to the grouping of the apertures in the card. This selection is effected by the abutment of the feelers against plates 52 of which there is one for each feeler. As shown in Fig. 6, the plates 52 are carried by oblique links so as to move obliquely and parallel under the influence of the feelers. The ends of the plates 52 are notched differently as shown by the four views $U^2$, I, II, III in Fig. 7, and are supported on rigid plates 53, as shown in Fig. 8. These plates are formed with gates within which vertical vanes 55, connected to the rods 47, can move when the rods are reciprocated. The plates 52 move within gates formed in the vanes 55 and prevent the rods 47 from dropping, when released by the cam 63, unless the notches or gates formed in the superposed plates 52 happen to be in register with the vanes. By virtue of the different groupings of apertures in the cards, the plates 52 will be set by the feelers for selecting the rods so as to sort the cards into the different hoppers. The cam 63 restores the operated rods to the normal position after the operation.

Figure 9:
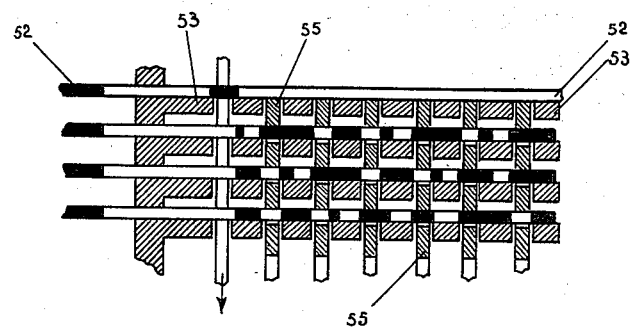
Figure 17:
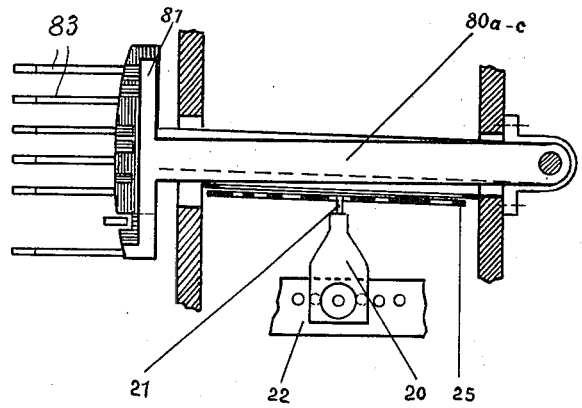
Fig. 17, is a view of a setting element, based on a different principle.
Figure 10:
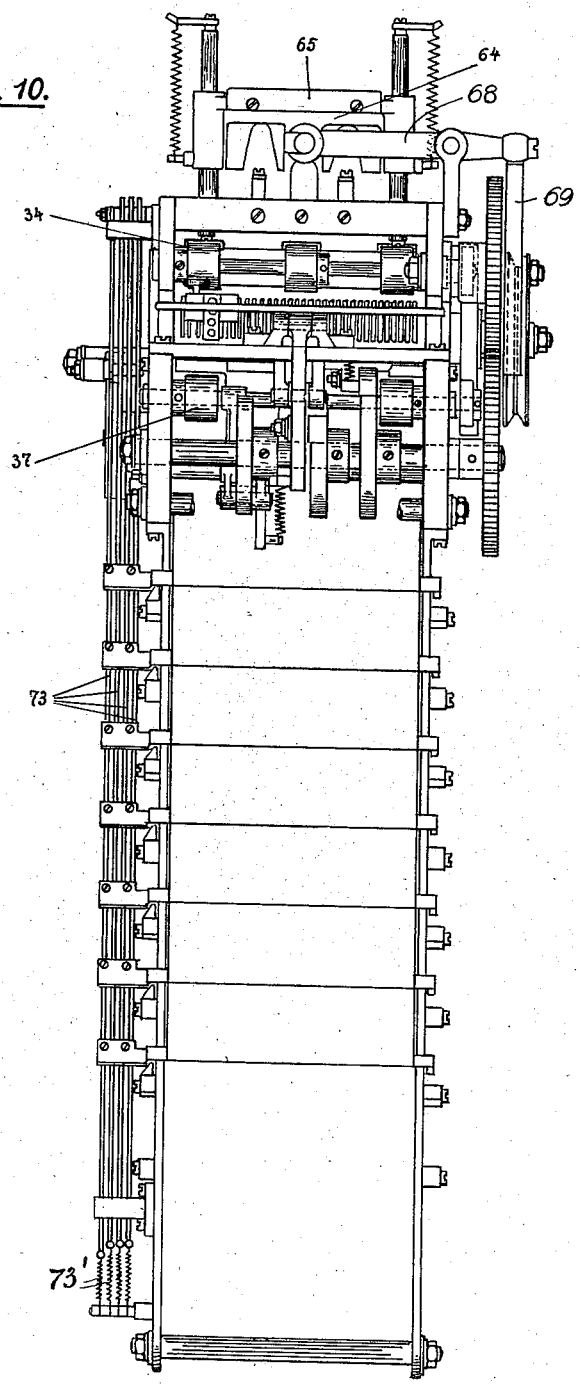
Fig. 10 is an elevation of a complete machine of a still further modified construction, Fig. 11, a side elevation of the same, Fig. 12, a longitudinal section, and Figs. 13 to 16, detail views of this construction.
Figure 11:
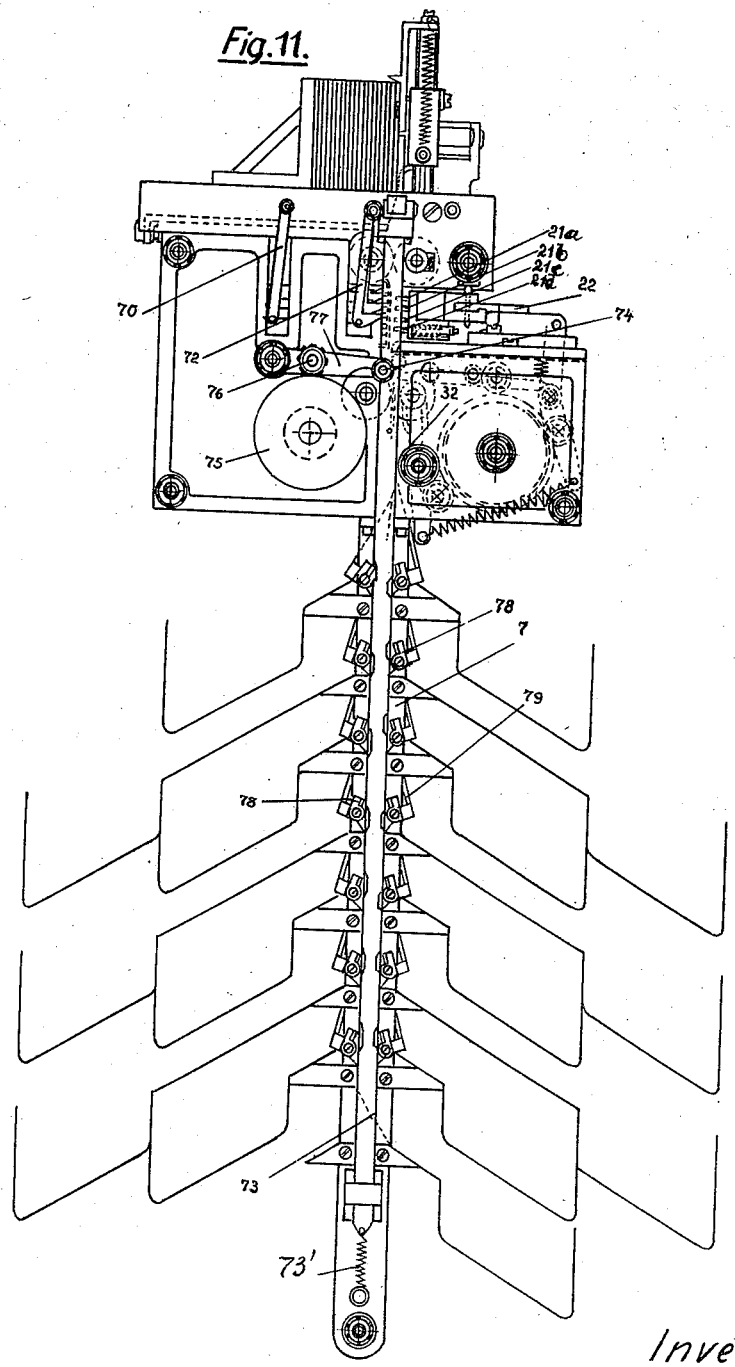

Fig. 9 shows a section of the selecting device.

The top plate 52 controls the rod whereby the flap 43 is operated for diverting the cards to the left branch of the channel 39.

The cards are fed into the machine between two rollers 34 (Fig. 5) and are caught by a ledge 35 carried by a bell-crank lever 35'. A roller on the free end of the latter contacts with a cam on the shaft $z$ and causes the ledge to release the card after the operation of the feelers and the selection of the sorting flaps. As soon as the card is released, another cam on the shaft 6 applies a clamping roller 37 to the card so as to press it against a transport roller 36 which then feeds the card into the channel 39. A head 20, to which the feelers are connected, is adjustably held on a slide 22' and secured to the latter by means of a screw 29 according to the position of the apertures on the cards. The slide 22' is reciprocated at the right moment by a cam on the shaft $z$ through the medium of a double-armed lever 20'.

In Figs. 10 to 16 a further modification of the device is shown in which the cards are sorted by the operation in each case of a single flap.

The feelers $21^{a-d}$, in passing through the cards, strike against bars 71 which are pivotally suspended on links 70 and 72 so as to form together with the latter a kind of frame. Each link 72 is formed at its lower end with a hook which normally engages a notch in a vertical bar 73 so as to prevent the latter from dropping under the attraction of a spring 73'. The bars 73 are arranged in juxtaposition and support transverse rods 78, each of which is held by a short lever arm on the shaft of a flap 79. The flaps 79 are arranged at opposite sides of a vertical passage 39' (Fig. 12) through which the cards drop when discharged by the rollers 36 and 37. The flaps are spring-actuated, and the position of each flap is controlled by the engagement of its rods 73 with the edges of all the bars 72. There are notches 79' in the edges of the bars into which each rod 78 can recede so as to allow the flap to interrupt the passage 39', as indicated by the arrow in Fig. 12, thereby diverting the card into one of the hoppers 1 to 14. When no flap is operated, the card goes direct to the lowermost hopper. Normally, at least one of the notches 79' is out of register with the bars 78, so that the flaps are prevented from interrupting the passage; and the setting of the bars for selecting any particular flap to receive the card, is effected by the release of one or more of the bars through the medium of the feelers as previously described. The bars are restored to the normal position by a cam 75 which for that purpose operates a lever 77 through the medium of a roller 76. A pin 74 at the free end of the lever engages shoulders on the bars so as to raise them in opposition to the springs 73'. While the cards are exposed to the feelers, the pin 74 is out of touch with the bars so that the latter can drop if released. The cards enter the machine through the medium of rollers 34 as previously described. The rollers 34 receive the cards from a pack 67 which is held by a weight-operated follower 66 against a reciprocating head 64. A projecting plate 65 on the latter engages the cards singly and feeds them into the machine. The head 64 is spring-pressed and is reciprocated by means of a double-armed lever 68 and a cam 69.

To obviate the friction caused by the engagement of the flaps with the edges of the bars 73, a cam-controlled release may be introduced which is withdrawn immediately after the feelers have been in operation.

Figs. 17 to 20 show a device in which the use of springs is reduced to a minimum. The flaps $86^{a-d}$, which may be made up of arms connected to shafts, are here operated in pairs, as in the construction shown in Fig. 5, by rods $85^{a-c}$. The upper ends of the rods carry pivotal bars $83^{a-c}$ which are normally held in an inclined position by a crank-operated frame 84, against the action of springs 82 which tend to hold them in an upright position, i. e., in the path of a frame 87 which is also crank-operated and which, when rocked, depresses the rods whose bars are in its path so as to operate the flaps. Even when the frame 84 recedes, the bars 83 are normally prevented from taking up the upright position, by abutment against superposed segments $81^{a-d}$, which are held by pivoted arms $80^{a-d}$. The segments are formed with different arrangements ($U^2$, I, II, III) of gates, as shown in Fig. 20. The feelers $21^{a-d}$, in passing through the cards, engage the spring-pressed arms $80^{a-d}$ and turn the segments so that one or more of their gates get into alignment opposite the bar or bars 83 which, when the frame 84 is withdrawn, can then take up the position in which it is depressed by the frame 87. Fig. 20 shows the bar along the line 1 admitted into operative position, those along the line U' and 1' to 6' being held back.

The frame 87 is connected by rods 90 with levers 89 which restore the rods to the normal position by engagement with shoulders on the same. A spring 88 can be employed for the same purpose, but is not necessary when the lever 89 is employed.

I claim:—

1. In a card sorting machine, the combination with a vertical delivery channel and with a pllurality of receivers communicating with said channels, of a plurality of flaps forming part of the channel walls and being arranged so as to divert admitted cards into different receivers according to their position, operating elements controlling said flaps, a plurality of feelers adapted to cooperate with the cards, and means whereby the feelers can be utilized for controlling as many operating elements as there are feelers plus the number of obtainable combinations of such feelers.

2. In a card sorting machine, the combination with a vertical delivery channel and with a plurality of receivers communicating with said channels, of flaps forming part of the channel walls and being arranged so as to divert admitted cards into the different branches according to their position, operating elements controlling said flaps, a plurality of selecting elements, a plurality of feelers for setting said selecting elements by cooperation with the cards, and means whereby an equal number of feelers and selecting elements can be utilized for controlling as many operating elements as there are feelers plus the number of obtainable combinations of such feelers.

3. In a card sorting machine, the combination with a vertical delivery channel and with a plurality of receivers communicating with said channels, of a plurality of flaps forming part of the channel walls and being arranged so as to divert admitted cards into different receivers according to their position, operating elements controlling said flaps, and feelers cooperating with differently grouped apertures in the admitted cards so as to select the different operating elements for operation, the number of feelers being equal to the number of apertures of the largest combination of such.

4. In a card sorting machine, the combination with a vertical delivery channel and with a plurality of receivers communicating with said channels, of a plurality of flaps forming part of the channel walls and being arranged so as to divert admitted cards into different receivers according to their position, vertical rods coupled to the flaps for operating the same, pivoted bars at the upper ends of the rods, a cam-controlled rocking frame for operating the rods by engagement with the pivoted bars, superposed segments carried by pivoted arms and arranged so as to prevent the pivoted bars from entering into engagement with the operating frame, the segments being provided with gates through which to admit the bars in different groupings into contact with the operating one according to the position in which they are set, and feelers adapted to be admitted through differently grouped apertures in the cards into contact with the segment arms so as to set the segments and select the different rods for operation.

5. In a card sorting machine, the combination with a vertical delivery channel and with a plurality of receivers communicating with said channels, of a plurality of flaps forming part of the channel walls and being arranged so as to divert admitted cards into different receivers according to their position, a series of vertical, spring-actuated bars supporting each flap and adapted to change the position of such flap when the bars are actuated by the springs in a certain grouping, pivoted hooks normally preventing the bars from moving, and feelers, adapted to be admitted through differently grouped apertures in the admitted cards for contacting with the hooks and releasing the bars so as to select the latter for operation.

MARTIN LEBEIS.